United States Patent
Ogawa et al.

(10) Patent No.: US 8,757,950 B2
(45) Date of Patent: Jun. 24, 2014

(54) STRUCTURE OF CROSS-SHAPED GROOVE OF SCREW FOR FIT WITH DRIVER BIT

(75) Inventors: Nobuhiro Ogawa, Saitama (JP); Naoki Yokoyama, Saitama (JP)

(73) Assignee: Crown Screw Corporation, Saitama (JP)

( * ) Notice: Subject to any disclaimer, the term of this patent is extended or adjusted under 35 U.S.C. 154(b) by 546 days.

(21) Appl. No.: 13/122,419

(22) PCT Filed: Oct. 7, 2009

(86) PCT No.: PCT/JP2009/005203
§ 371 (c)(1),
(2), (4) Date: Apr. 4, 2011

(87) PCT Pub. No.: WO2010/041437
PCT Pub. Date: Apr. 15, 2010

(65) Prior Publication Data
US 2011/0182696 A1    Jul. 28, 2011

(30) Foreign Application Priority Data
Oct. 10, 2008    (JP) .................................. 2008-264293

(51) Int. Cl.
*F16B 35/06* (2006.01)
*F16B 23/00* (2006.01)

(52) U.S. Cl.
CPC ......... *F16B 23/0023* (2013.01); *F16B 23/0061* (2013.01)
USPC .......................................... 411/404; 411/408

(58) Field of Classification Search
USPC ............ 411/402–404, 407–409, 919; 81/436, 81/460, 461
See application file for complete search history.

(56) References Cited

U.S. PATENT DOCUMENTS 2,046,837 A * 7/1936 Phillips ........................... 81/460
2,046,839 A * 7/1936 Phillips et al. ................ 411/404
(Continued)

FOREIGN PATENT DOCUMENTS

JP    56-14614      2/1981
JP    6-511303      12/1994
(Continued)

OTHER PUBLICATIONS

International Search Report issued Nov. 10, 2009 in International (PCT) Application No. PCT/JP2009/005203.

(Continued)

*Primary Examiner* — Victor Batson
*Assistant Examiner* — Caroline L Natirboff
(74) *Attorney, Agent, or Firm* — Wenderoth, Lind & Ponack, L.L.P.

(57) ABSTRACT

A screw has a head with a cross-shaped groove having first to fourth wing grooves, each having bilaterally-formed inner side faces defined by opposing base-end inner side faces, opposing intermediate inner side faces and opposing distal-end inner side faces angled at angles relative to each other so that the first angle of the base-end inner side face<the second angle of the intermediate inner side face<the third angle of the distal-end inner side face. The base-end inner side faces define a trapezoidal base, the distal-end inner side faces define an inverse-trapezoidal distal-end groove, and the intermediate inner side faces define an approximately parallel intermediate groove between each base-end groove and each distal-end groove. Each of the inner side faces is provided with an elevation angle spreading toward an opening face of the cross-shaped groove.

4 Claims, 5 Drawing Sheets

(56) References Cited

U.S. PATENT DOCUMENTS

| | | | | |
|---|---|---|---|---|
| 2,084,079 A * | 6/1937 | Clark | .......................... | 411/403 |
| 2,400,684 A * | 5/1946 | Clark | .............................. | 81/460 |
| 2,474,994 A * | 7/1949 | Tomalis | ....................... | 411/404 |
| 2,588,404 A * | 3/1952 | Muenchinger | ................ | 411/404 |
| 2,592,462 A * | 4/1952 | Phipard, Jr. | ................... | 411/481 |
| 3,237,506 A * | 3/1966 | Muenchinger | ................ | 411/404 |
| 4,084,478 A * | 4/1978 | Simmons | ..................... | 411/404 |
| 5,120,173 A | 6/1992 | Grady | | |
| 5,203,657 A * | 4/1993 | Nagoshi et al. | ............... | 411/399 |
| 5,203,742 A * | 4/1993 | Grady | ........................... | 470/63 |
| 5,205,694 A * | 4/1993 | Nagoshi et al. | ............... | 411/399 |
| 5,364,212 A * | 11/1994 | Gill | ................................ | 411/404 |
| 6,223,634 B1 * | 5/2001 | Hughes et al. | ................. | 81/460 |
| 6,341,546 B1 * | 1/2002 | Totsu | .............................. | 81/460 |
| 6,378,406 B1 | 4/2002 | Totsu | | |
| 6,575,061 B2 * | 6/2003 | Wagner | ........................... | 81/460 |
| 6,584,876 B2 * | 7/2003 | Totsu | .............................. | 81/460 |
| 6,601,482 B2 * | 8/2003 | Hughes et al. | ................. | 81/460 |
| 6,886,433 B2 * | 5/2005 | Totsu | .............................. | 81/460 |
| 7,077,038 B2 * | 7/2006 | Toyooka et al. | ................ | 81/460 |
| 8,261,641 B2 * | 9/2012 | Nojikawa | ........................ | 81/460 |
| 2003/0002952 A1 | 1/2003 | Totsu | | |
| 2008/0145183 A1 * | 6/2008 | Lin | ............................... | 411/404 |

FOREIGN PATENT DOCUMENTS

| | | |
|---|---|---|
| JP | 2000-108043 | 4/2000 |
| JP | 2000-230526 | 8/2000 |
| JP | 2001-193719 | 7/2001 |
| JP | 2004/065803 | 8/2004 |
| JP | 2006-106269 | 4/2005 |
| JP | 2008-256124 | 10/2008 |
| JP | 2009-8134 | 1/2009 |
| WO | 2009/001635 | 12/2008 |
| WO | 2010/041437 | 4/2010 |

OTHER PUBLICATIONS

"FIRM < Original products < Products Information < Crown Screw Corporation"; Webpage, indicated publication date Jan. 8, 2008.

* cited by examiner

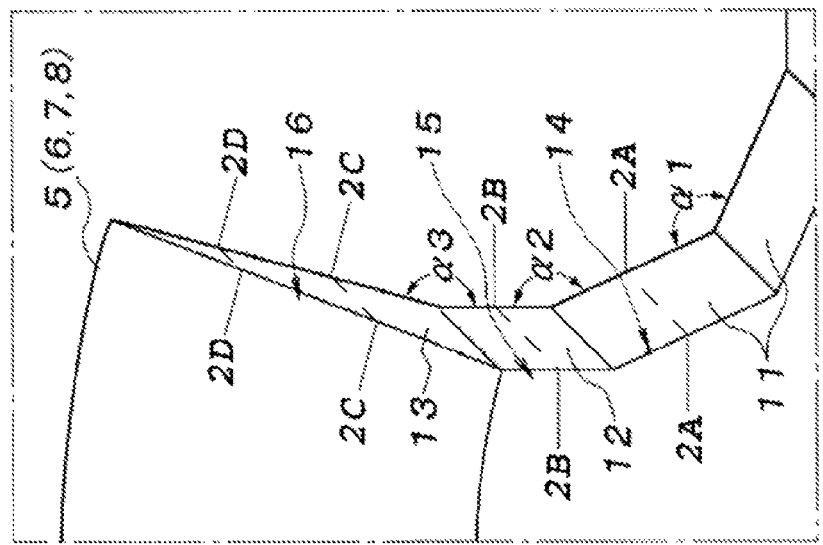
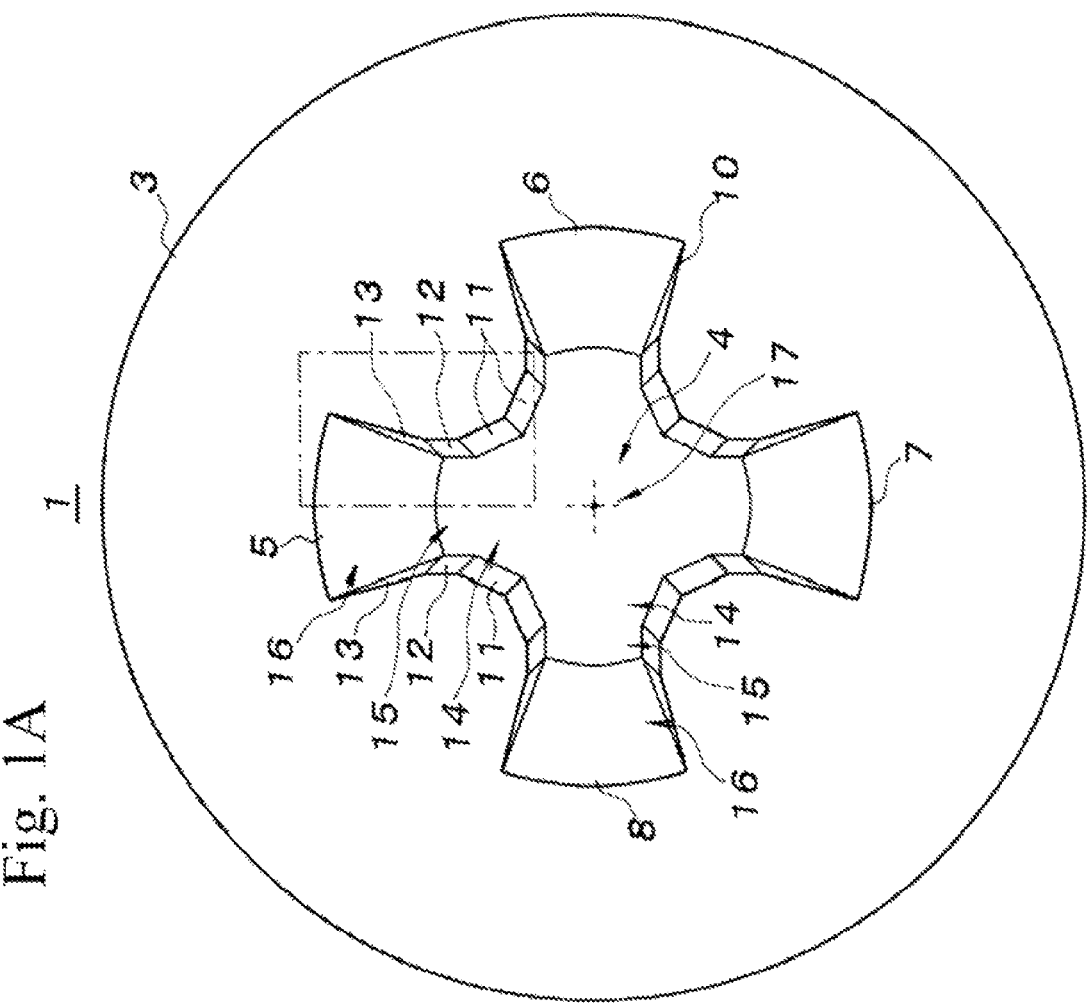

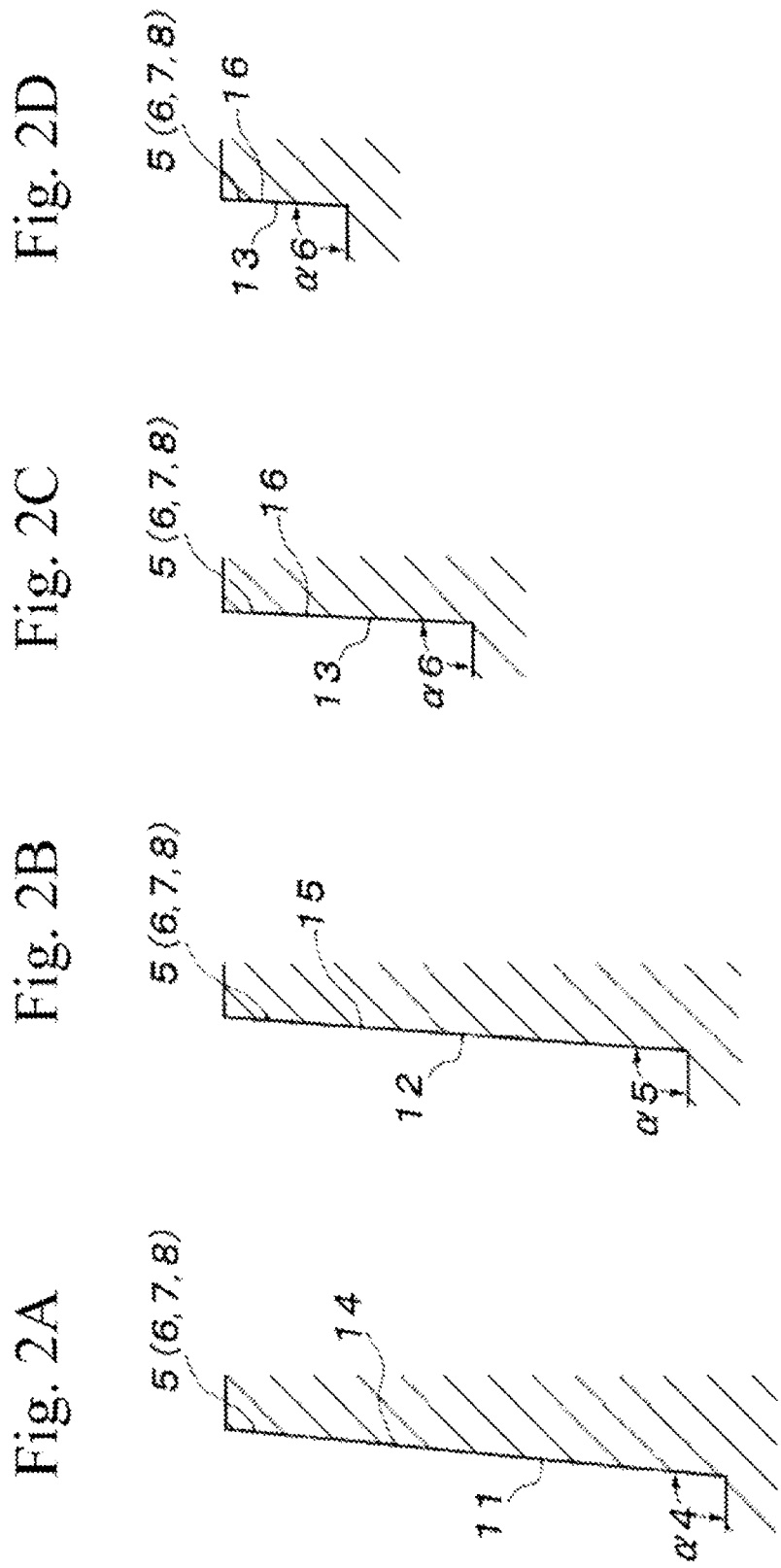

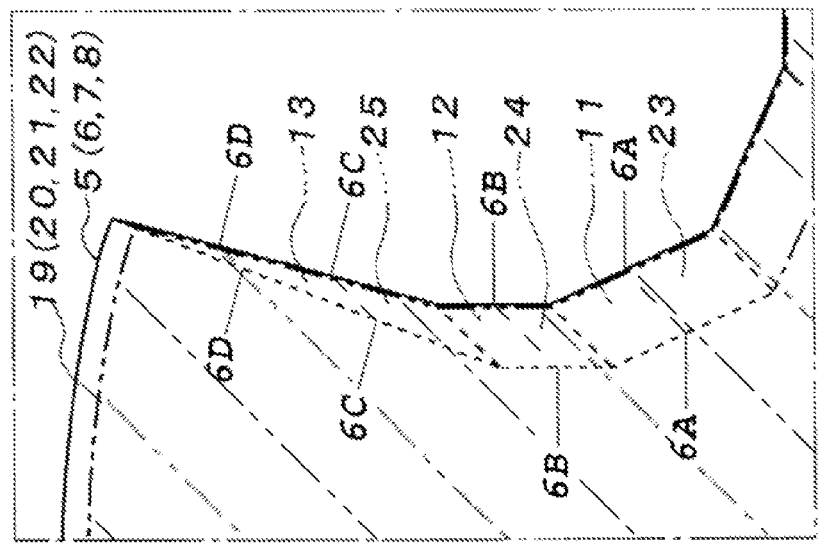
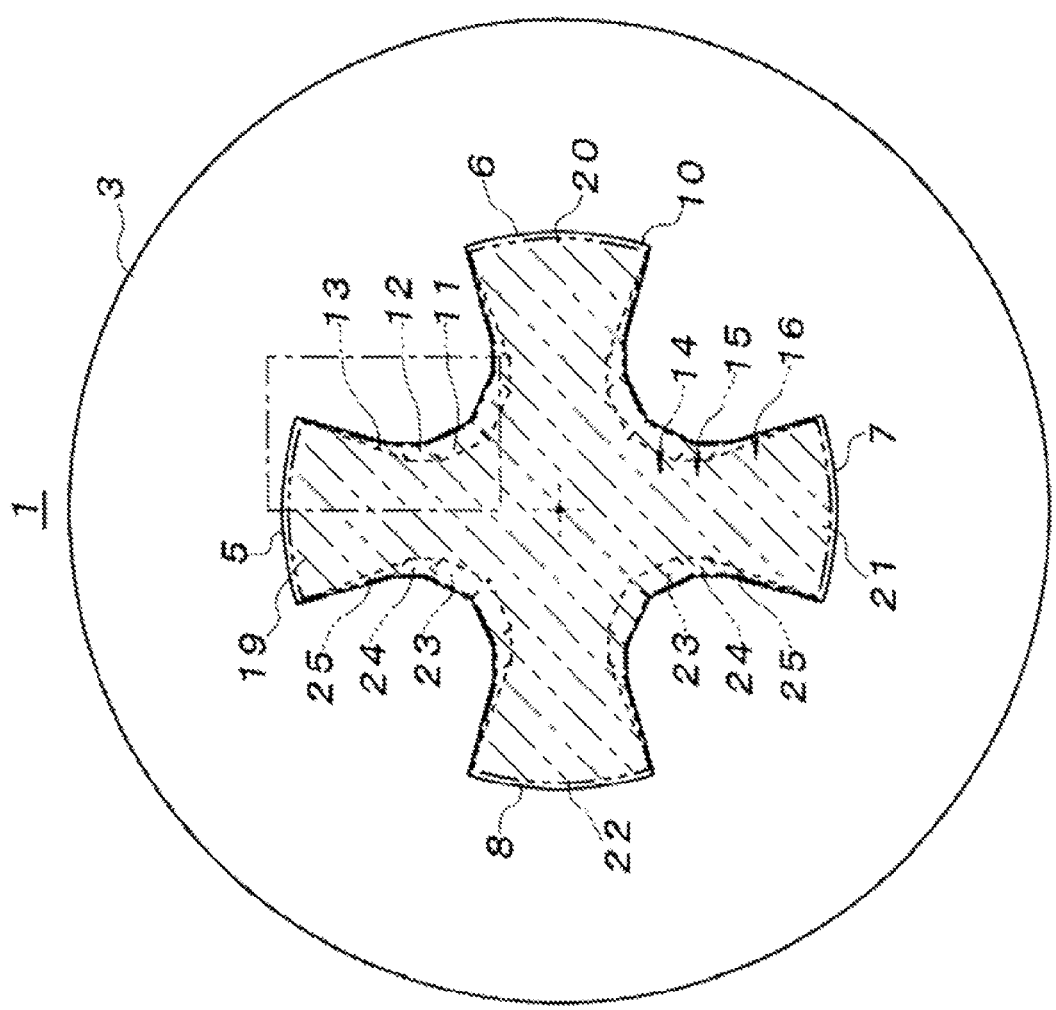

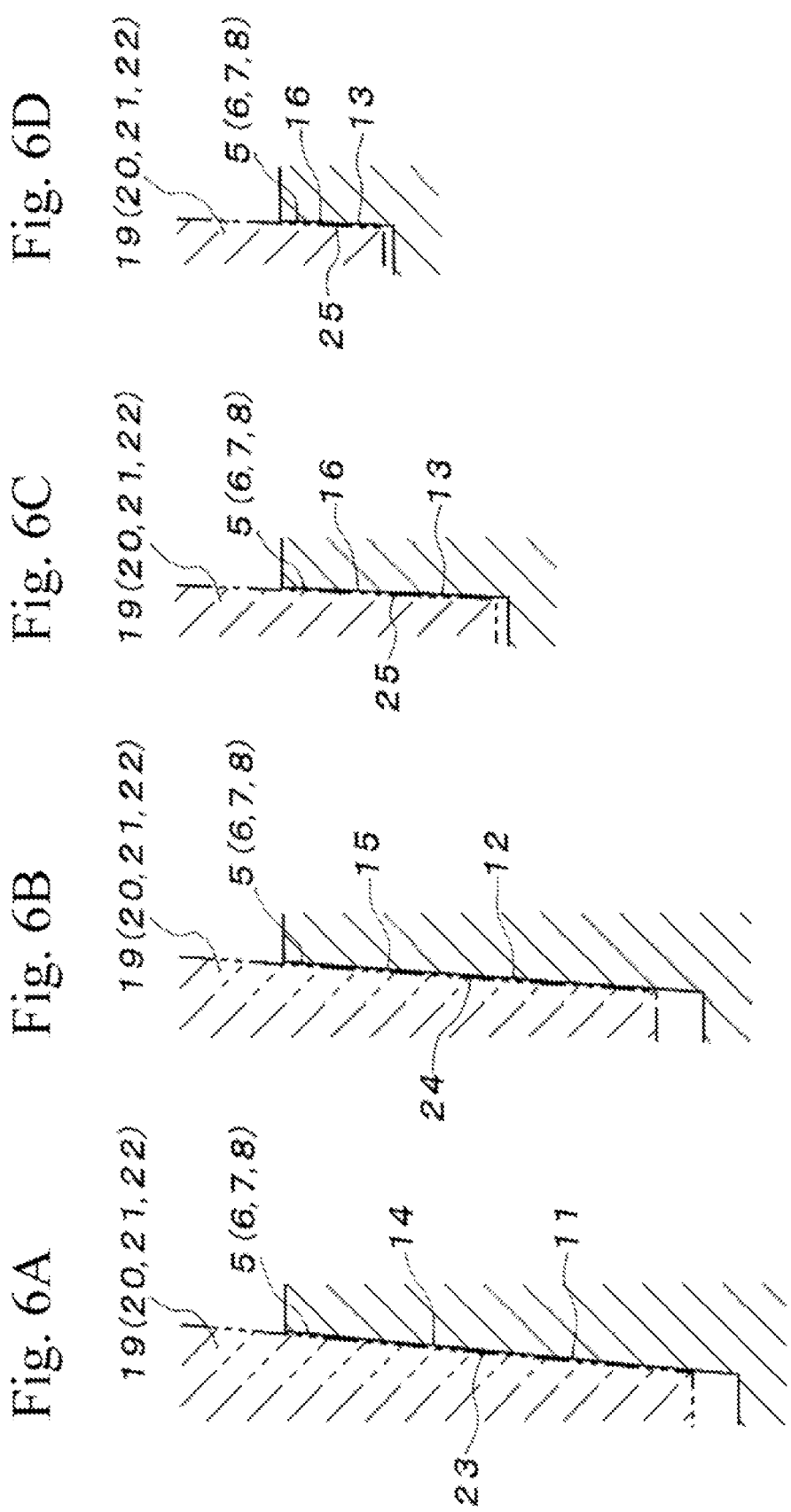

STRUCTURE OF CROSS-SHAPED GROOVE OF SCREW FOR FIT WITH DRIVER BIT

TECHNICAL FIELD

The present invention relates to structure of a cross-shaped groove of a screw for fit with a driver bit in the case that the screw is screwed as the cross-shaped groove formed at a screw head being fit with the cross-shaped driver bit.

BACKGROUND ART

Japanese Patent-laid-open 2000-230526 discloses a structure of a cross-shaped groove in which each pair of inner side faces of the first to fourth wing grooves forming the cross-shaped groove are parallel except at distal end portions thereof, the distal end portions are inclined outwardly sideward, and all inner side faces of the first to fourth wing grooves are vertical.

As all inner side faces of the first to fourth wing grooves are vertical faces, it may be said that coming-off caused by upward sliding of a driver bit (i.e., upward slipping of a driver bit) during rotation hardly occurs. However, interlocking effect when the cross-shaped hole is fit with a driver bit is insufficient to cause a problem that the screw drops off from the driver bit.

Further, there is a fear of occurrence of misalignment of centering of the screw against a pilot hole and non-smooth operation of screw alignment against a pilot hole entry with the driver bit to eventually cause an oblique screwing problem due to excessive clearance between the first to fourth wing teeth of the driver bit and every vertical inner side face of the first to fourth wing grooves.

SUMMARY OF THE INVENTION

The present invention provides a structure of a cross-shaped groove of a screw for fit with a driver bit being capable of efficiently transmitting rotational force of the driver bit to the screw while obtaining effect of excellent interlocking with the driver bit.

A cross-shaped groove of a screw for fit with a driver bit according to the present invention includes the following structures A to F.

A: The cross-shaped groove for fit with a driver bit is formed at a top face of a head portion which is formed at one end of a screw shaft portion.

B: Bilaterally-formed inner side faces of each of the first to the fourth wing grooves of the cross-shaped groove are defined into a pair of base-end inner side faces, a pair of intermediate inner side faces and a pair of distal-end inner side faces.

C: The base-end inner side faces are angled at a first angle outwardly sideward relative to the base-end inner side face of the adjacent wing groove, the intermediate inner side faces are angled at a second angle outwardly sideward respectively relative to the base-end inner side faces, and the distal-end inner side faces are angled at a third angle outwardly sideward respectively relative to the intermediate inner side faces.

D: The respective angles (inner angles) are set to satisfy the relation of:
the first angle of the base-end inner side face<the second angle of the intermediate inner side face<the third angle of the distal-end inner side face.

E: A trapezoidal base-end groove which gradually spreads toward a center hole (in a radially inward direction) of the cross-shaped groove is defined by opposed faces of the respective base-end inner side faces, an inverse-trapezoidal distal-end groove which gradually spreads toward the distal side (in a radially outward direction) is defined by opposed faces of the respective distal-end inner side faces, and an approximately parallel intermediate groove between each base-end groove and each distal-end groove is defined by opposed faces of the respective intermediate inner side faces.

F: Each of the base-end inner side face, the intermediate inner side face and the distal-end inner side face has an elevation angle spreading toward an opening face of the cross-shaped groove.

According to the present invention, there is cooperation among a structure of defining three inner side faces of the base-end inner side face, the intermediate inner side face and the distal-end inner side face, a structure of providing an angle to each inner side face, and a structure of providing an elevation angle to each inner side face. Accordingly, it is possible to provide a screw having a cross-shaped groove for fit with a driver bit with which rotational force of the driver bit can be effectively transmitted to the screw, excellent interlocking effect can be further obtained when the cross-shaped groove is fit with the driver bit, and centering and screwing of the screw can be easily performed against a pilot hole.

BRIEF DESCRIPTION OF THE DRAWINGS

FIG. 1A is a plan view of a structure of a cross-shaped groove of a screw for fit with a driver bit according to the present invention and FIG. 1B is a partially enlarged view of the area denoted by phantom lines in FIG. 1A.

FIG. 2A is a sectional view at line 2A-2A of FIG. 1B, FIG. 2B is a sectional view at line 2B-2B thereof, FIG. 2C is a sectional view at line 2C-2C thereof, and FIG. 2D is a sectional view at line 2D-2D thereof.

FIG. 5A is a lateral sectional view along a top face of a screw head portion illustrating a state that the cross-shaped groove is fit with the driver bit; and FIG. 5B is a partially enlarged view of the area denoted by phantom lines in FIG. 5A.

FIG. 6A is a sectional view at line 6A-6A of FIG. 5B, FIG. 6B is a sectional view at line 6B-6B thereof, FIG. 6C is a sectional view at line 6C-6C thereof, and FIG. 6D is a sectional view at line 6D-6D thereof.

DETAILED DESCRIPTION OF THE INVENTION

Figure 3:
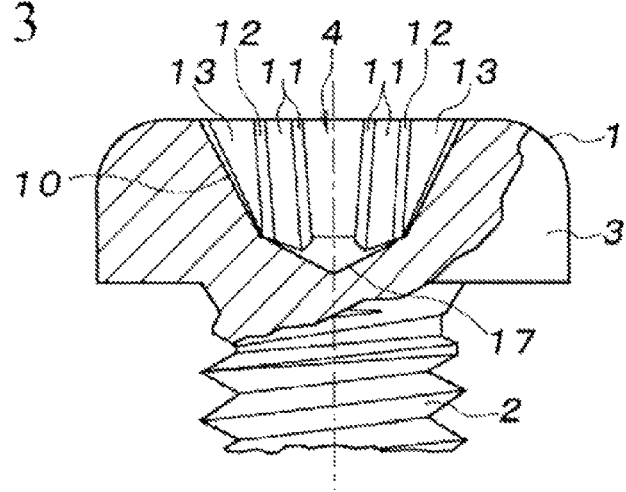
FIG. 3 is a longitudinal sectional view of the cross-shaped groove to be fit with a driver bit.

In the following, a preferred embodiment of the present invention will be described with reference to FIGS. 1A to 6D.

As illustrated in FIGS. 1A, 1B, 3 and 4, a screw 1 is provided with a head portion 3 being circular in plan view at one end of a screw shaft portion 2 having an axis line of the screw shaft 2 as the center thereof.

A center hole 4 having its center on the axis line is formed at the center of an upper face of the head portion 3. The first to fourth wing grooves 5, 6, 7, 8 are formed at an inner circumferential wall of the center hole 4 at intervals of 90°.

The center hole 4 and the first to fourth wing grooves 5, 6, 7, 8 gradually converge toward the lower end and gradually spread upward as being opened at a top face of the head portion 3.

A cone-shaped hole 17 terminating on the axis line is formed at the lower end of the center hole 4. Respective lower ends of the first to fourth wing grooves 5, 6, 7, 8 terminate at the upper end of the cone-shaped hole 17.

A cross-shaped groove 10 for fit with a driver bit 9 is constituted with the center hole 4 and the first to fourth wing grooves 5, 6, 7, 8.

Inner side faces bilaterally formed corresponding to each of the first to fourth wing grooves 5, 6, 7, 8 are defined into a pair of base-end inner side faces 11, a pair of intermediate side faces 12, and a pair of distal-end inner side faces 13.

The base-end inner side face 11 is angled at a first angle α1 outwardly sideward relative to the base-end inner side face 11 of the adjacent wing groove. The intermediate inner side face 12 is angled at a second angle α2 outwardly sideward relative to the base-end inner side face 11. The distal-end inner side face 13 is angled at a third angle α3 outwardly sideward relative to the intermediate side face 12.

The respective angles (i.e., inner angles) are set to satisfy the relation of:

the first angle α1 of the base-end inner side face 11<the second angle α2 of the intermediate inner side face 12<the third angle α3 of the distal-end inner side face 13.

As a specific example, the angles α1, α2 and α3 are set respectively to 140°, 156° and 164°.

The respective angles α1, α2 and α3 are set within a range of ±(1~8)° as a range of the embodiment. That is, the above relation is satisfied as setting α1, α2 and α3 respectively within the ranges of 140°±(1~8)°, 156°±(1~8)° and 164°±(1~8)°.

The opposed faces of the base-end inner side faces 11 define a trapezoidal base-end groove 14 which gradually spreads toward the center hole 4 of the cross-shaped groove 10 (i.e., in a radially inward direction). The opposed faces of the distal-end inner side faces 13 define an inverse-trapezoidal distal-end groove 16 which gradually spreads toward the distal side (i.e., in a radial outward direction). The opposed faces of the intermediate inner side faces 12 define an approximately parallel intermediate groove 15 between the base-end groove 14 and the distal-end groove 16.

Each of the base-end inner side face 11, the intermediate inner side face 12 and the distal-end inner side face 13 has an elevation angle spreading toward the opening face of the cross-shaped groove 10.

FIG. 2A is a sectional view at line 2A-2A of FIG. 2B, FIG. 2B is a sectional view at line 2B-2B thereof, FIG. 2C is a sectional view at line 2C-2C thereof, and FIG. 2D is a sectional view at line 2D-2D thereof.

Following is a specific example thereof. An elevation angle α4 of the base-end inner side face 11 relative to a bottom face of the wing groove is set in a range between 95° and 96° as illustrated in FIG. 2A. An elevation angle α5 of the intermediate inner side face 12 against a bottom face of the wing groove is set in a range between 94° and 95° as illustrated in FIG. 2B. An elevation angle α6 of the distal-end inner side face 13 against a bottom face of the wing groove is set in a range between 92° and 93° as illustrated in FIGS. 2C and 2D.

As being exemplified by the above numerical values, the respective elevation angles are obtuse and are set to satisfy the relation of α4>α5>α6.

The distal-end inner side face 13 is constituted with a flat face of an acute triangle of which width is large at an end part of a ridge side formed continuously to the intermediate inner side face 12 (i.e., corresponds to ridge length) and is terminated as being gradually shrunk toward the distal-end side (i.e., radially outwardly). The sectional view at line 2C-2C is a sectional view at a middle part of the distal-end inner side face 13 and the sectional view at line 2D-2D is a sectional view at the vicinity of the distal end thereof.

Further, the intermediate inner side face 12 is slightly wide at an end part of a ridge side formed continuously to the base-end inner side face 11 (i.e., corresponds to ridge length). Similarly, the base-end inner side face 11 is slightly wide at an end part of a ridge side formed continuously to the adjacent base-end inner side face 11 (i.e., corresponds to ridge length). Each of the above is constituted with a flat face of an approximate parallelogram.

Further, as clearly can be seen from comparison among the respective sectional views of FIGS. 2A to 2D, height of each inner side face is set as satisfying:

height of the base-end inner side face 11>height of the intermediate inner side face 12>height of the distal-end inner side face 13.

The drawings illustrate a specific example in which the relative height ratio among the respective inner side faces of the base-end inner side face 11, the intermediate inner side face 12, the middle part of the distal-end inner side face 13 and the distal end vicinity of the distal-end inner side face 13 is set to be 1:0.94:0.61:0.31.

Figure 4:
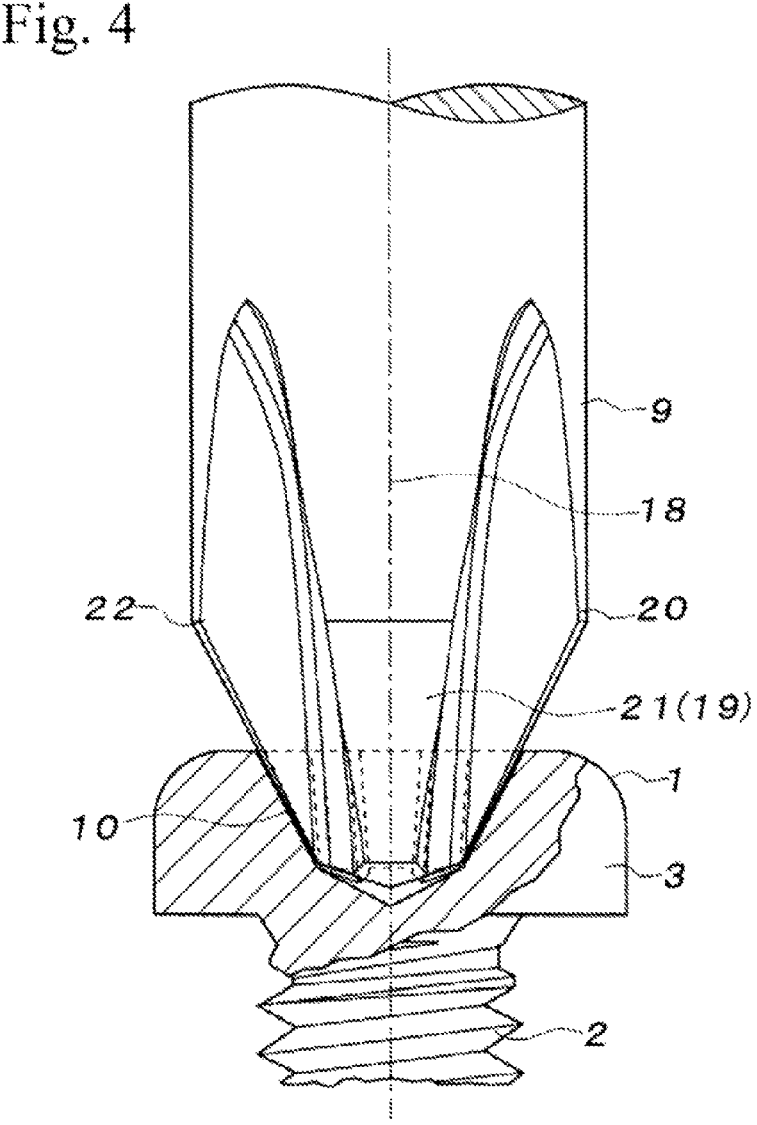
FIG. 4 is a longitudinal sectional view illustrating a state that the cross-shaped groove is fit with the driver bit.

FIG. 4 is a longitudinal sectional view illustrating a state that the cross-shaped groove 10 is fit with the driver bit 9. FIG. 5A is a lateral sectional view along a top face of a head portion 3 illustrating a state that the cross-shaped groove 10 is fit with the driver bit 9.

As illustrated in the drawings, the driver bit 9 has the first to fourth wing teeth 19, 20, 21, 22 being protruded in four directions at intervals of 90° from a circumferential face of a center portion 18 of the driver bit 9 to form an approximately same shape as the cross-shaped groove which is formed with the center hole 4 and the first to fourth wing grooves 5, 6, 7, 8. Each of the wing teeth 19, 20, 21, 22 includes a base-end outer side face 23, an intermediate outer side face 24 and a distal-end outer side face 25 corresponding to the inner side faces 11, 12, 13 of each of the wing grooves 5, 6, 7, 8.

The first to fourth wing teeth 19, 20, 21, 22 are fit to the first to fourth wing grooves 5, 6, 7, 8 as illustrated in FIGS. 6A to 6D.

FIG. 6A is a sectional view at line 6A-6A of FIG. 5B, FIG. 6B is a sectional view at line 6B-6B thereof, FIG. 6C is a sectional view at line 6C-6C thereof, and FIG. 6D is a sectional view at line 6D-6D thereof. The respective section index lines are at the same position as those in FIGS. 2A-2D. Similarly to FIGS. 2C and 2D, FIGS. 6C and 6D are sectional views respectively at the middle part and the vicinity of the distal end of the distal end inner side face 13.

As illustrated in FIGS. 6A to 6D, a mutually intimate contact state or a mutually approximately-intimate contact state is maintained between the base-end inner side face 11 of the wing groove and the base-end outer side face 23 of the wing tooth, between the intermediate inner side face 12 of the wing groove and the intermediate outer side face 24 of the wing tooth, and between the distal-end inner side face 13 of the wing groove and the distal-end outer side face 25 of the wing tooth.

Preferably, manufacturing is performed so as to maintain a mutually intimate contact state or a mutually approximately-intimate contact state at least between the base-end inner side face 11 of the wing groove and the base-end outer side face 23 of the wing tooth and between the intermediate inner side face 12 of the wing groove and the intermediate outer side face 24 of the wing tooth.

When the driver bit 9 is rotated to the right or to the left, the wing teeth of the driver bit 9 efficiently transmit rotational force to the base-end inner side faces 11, the intermediate inner side faces 12 and the distal-end inner side faces 13 of the wing grooves. Accordingly, reliable fastening due to rotation of the screw 1 can be obtained. In this manner, an object of desired fastening can be achieved without requiring unnecessarily strong squeezing of the driver bit 9 to the back in the cross-shaped groove 10.

The invention claimed is:

1. A screw including a screw shaft portion, and a head portion formed at a top end of the screw shaft portion, the head portion having a cross-shaped groove formed therein for fit with a driver bit,
   wherein the cross-shaped groove has a center hole, and first, second, third and fourth wing grooves extending radially outwardly therefrom, and
   wherein, for each of the first, second, third and fourth wing grooves:
      bilaterally-formed inner side faces are defined into a pair of base-end inner side faces disposed adjacent the center hole, a pair of intermediate inner side faces disposed radially outwardly of the base-end inner side faces, respectively, and a pair of distal-end inner side faces disposed radially outwardly of the intermediate inner side faces, respectively;
      the base-end inner side faces are angled at a first angle outwardly sideward respectively relative to the base-end inner side faces of adjacent ones of the wing grooves, the intermediate inner side faces are angled at a second angle outwardly sideward respectively relative to the base-end inner side faces, and the distal-end inner side faces are angled at a third angle outwardly sideward respectively relative to the intermediate inner side faces;
      the first angle of the base-end inner side faces<the second angle of the intermediate inner side faces<the third angle of the distal-end inner side faces;
      opposed faces of the base-end inner side faces define a trapezoidal base-end groove which gradually spreads radially inwardly toward the center hole of the cross-shaped groove, opposed faces of the distal-end inner side faces define an inverse-trapezoidal distal-end groove which gradually spreads radially outwardly away from the center hole, and opposed faces of the intermediate inner side faces define an approximately parallel intermediate groove disposed radially outwardly of the base-end groove and radially inwardly of the distal-end groove;
      each of the base-end inner side faces, the intermediate inner side faces and the distal-end inner side faces has an elevation angle spreading toward an opening face of the cross-shaped groove;
      a first elevation angle of each of the base-end inner side faces relative to a bottom face of the wing groove is set in a range between 95° and 96°, a second elevation angle of each of the intermediate inner side faces relative to the bottom face of the wing groove is set in a range between 94° and 95°, and a third elevation angle of each of the distal-end inner side faces relative to the bottom face of the wing groove is set in a range between 92° and 93°;
      the first, second and third elevation angles are obtuse angles; and
      the first elevation angle of the base-end inner side faces relative to the bottom face of the wing groove>the second elevation angle of the intermediate inner side faces relative to the bottom face of the wing groove>the third elevation angle of the distal-end inner side faces relative to the bottom face of the wing groove.

2. The screw according to claim 1, wherein, for each of the first, second, third and fourth wing grooves:
   heights of the base-end inner side faces>heights of the intermediate inner side faces>heights of the distal-end inner side faces; and
   a relative height ratio among the base-end inner side faces, the intermediate inner side faces, radially middle parts of the distal-end inner side faces, and radially outer end portions of the distal-end inner side faces is 1:0.94:0.61:0.31.

3. The screw according to claim 2, wherein, for each of the first, second, third, and fourth wing grooves,
   the base-end inner side faces are continuous with and have respective edges in common with the intermediate inner side faces, respectively, and the intermediate inner side faces are continuous with and have respective edges in common with the distal-end inner side faces, respectively.

4. The screw according to claim 1, wherein, for each of the first, second, third, and fourth wing grooves,
   the base-end inner side faces are continuous with and have respective edges in common with the intermediate inner side faces, respectively, and the intermediate inner side faces are continuous with and have respective edges in common with the distal-end inner side faces, respectively.

* * * * *